(12) United States Patent
Fowler et al.

(10) Patent No.: US 7,414,653 B2
(45) Date of Patent: Aug. 19, 2008

(54) DARK REDUCTION VIA FEEDBACK CONTROL OF PHOTODIODE BIAS

(75) Inventors: Boyd A. S. Fowler, Sunnyvale, CA (US); Janusz K. Balickl, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 1153 days.

(21) Appl. No.: 10/742,070

(22) Filed: Dec. 19, 2003

(65) Prior Publication Data

US 2005/0134715 A1 Jun. 23, 2005

(51) Int. Cl.
*H04N 3/14* (2006.01)
*H04N 5/335* (2006.01)

(52) U.S. Cl. ..................... 348/308; 348/310
(58) Field of Classification Search ............ None
See application file for complete search history.

(56) References Cited

U.S. PATENT DOCUMENTS

| | | | |
|---|---|---|---|
| 6,246,436 B1 | 6/2001 | Lin et al. | |
| 6,339,363 B1 | 1/2002 | Fowler | |
| 6,424,375 B1 | 7/2002 | Fowler | |
| 6,459,078 B1 | 10/2002 | Fowler | |
| 6,525,769 B1 * | 2/2003 | Thomas et al. | 348/243 |
| 6,545,711 B1 | 4/2003 | Perner et al. | |
| 6,849,845 B2 * | 2/2005 | Lauffenberger et al. | 250/214 SW |
| 6,956,607 B2 * | 10/2005 | Mizuno et al. | 348/308 |

OTHER PUBLICATIONS

A. Graupner, M. Tanzer, R. Schuffny. CMOS image sensor with shared in-pixel amplifier and calibration facility. Circuits and Systems, 2002. APCCAS '02, 2002 Asia-Pacific Conference on. Volumen. 2, Oct. 28-31, 2002. pp. 93-96 vol.2.*
W. Guggenbuhl, T. Loeliger, M. Uster, and F. Grogg. CMOS circuit for low photocurrent measurements. In IEEE International Workshop on Emergent Technologies for Instrumentation and Measurement, Seiten 62-67, 1996.*
B. Zand, K. Phang, D.A. Johns. Transimpedance amplifier with differential photodiode current sensing. Circuits and Systems, 1999, ISCAS '99, Proceedings of the 1999 IEEE International Symposium on. vol. 2, May 30-Jun. 2, 1999. pp. 624-627 vol.2.*

* cited by examiner

*Primary Examiner*—Ngoc-Yen T. Vu
*Assistant Examiner*—Cynthia Calderon
(74) *Attorney, Agent, or Firm*—RatnerPrestia

(57) ABSTRACT

An active pixel sensor comprises a photodiode providing a photodiode output current indicative of an intensity of light incident the photodiode and an integrator circuit electrically coupled to the photodiode. The integrator circuit is configured to provide a pixel voltage representing an integration of the photodiode output current when the photodiode is exposed to light and dark leakage current through the photodiode when the photodiode is not exposed to light. The integrator circuit is configured to set a reverse bias voltage on the photodiode and respond to at least one control input to set the reverse bias voltage to a first level. The active pixel sensor comprises a feedback loop configured to receive the pixel voltage and control the integrator circuit to adjust the reverse bias voltage to substantially reduce the dark leakage current through the photodiode to a desired level.

23 Claims, 5 Drawing Sheets

DARK REDUCTION VIA FEEDBACK CONTROL OF PHOTODIODE BIAS

BACKGROUND

One type of imaging sensor utilizes Complementary Metal Oxide Semiconductor (CMOS) active pixels. Active Pixel Sensors (APSs) are utilized in various CMOS imaging devices, such as light sensors, telescopes, digital cameras, and video recorders. An APS captures an image of a scene of interest or detects light by converting incident light from the scene into electrical signals in an analog form.

A typical APS has an array of pixels or discrete regions, each pixel containing a light-sensitive element. The light-sensitive element can be a variety of elements including a photodiode, phototransistor, or other suitable device. Each light-sensitive element in a pixel generates a separate electrical current, which is proportional to the intensity of the incident light on that element. The varying magnitude of this electrical current is used as a basis for conversion into a stream of digital image data by an analog-to-digital converter (ADC). The digitized image data from all the pixels can then be displayed in a variety of formats, such as a composite image on a monitor or printed onto a sheet of paper. The digitized image data can also be analyzed for information concerning the properties of objects in the scene.

Many imaging sensors currently being designed include pixels having a photodiode. Photodiodes have certain limitations that must be accounted for when they are used in pixels in an APS. All photodiodes typically suffer from dark current, which is a leakage current from the photodiode when no light is striking the photodiode. Dark current occurs at any temperature above absolute zero and is temperature sensitive. As the temperature of the photodiode increases, the dark current increases as well. The amount of dark current also depends upon the material used to make the photodiode. In some APSs in certain light conditions, the dark current can be of the same order of magnitude as the current induced by photons striking the photodiode, thereby making the current induced by the photons indistinguishable from the dark current.

For example, because of dark current limitations, APSs for sensing infrared light are typically manufactured using indium gallium arsenide (InGaAs). InGaAs is typically used because it has a relatively high quantum efficiency and a relatively low dark current, but InGaAs has several disadvantages. InGaAs is relatively expensive compared to other semiconductor materials, such as germanium. InGaAs is also not as readily available as other semiconductor materials. In addition, use of InGaAs produces a relatively low yield. In the past, materials such as germanium and others, which are less expensive, readily available, and result in higher yields than InGaAs, have not been used to manufacture APSs for certain applications, such as for sensing infrared light. The excessive leakage current at room temperature of sensors made from these materials would render the sensors useless for sensing infrared light.

Therefore, there is a need for APSs that can compensate for leakage current in photodiodes.

SUMMARY

One aspect of the present invention provides an active pixel sensor. The active pixel sensor comprises a photodiode providing a photodiode output current indicative of an intensity of light incident the photodiode and an integrator circuit electrically coupled to the photodiode. The integrator circuit is configured to provide a pixel voltage representing an integration of the photodiode output current when the photodiode is exposed to light and dark leakage current through the photodiode when the photodiode is not exposed to light. The integrator circuit is configured to set a reverse bias voltage on the photodiode and respond to at least one control input to set the reverse bias voltage to a first level. The active pixel sensor comprises a feedback loop configured to receive the pixel voltage and control the integrator circuit to adjust the reverse bias voltage to substantially reduce the dark leakage current through the photodiode to a desired level.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As discussed in the Background section of the present application, one of the major problems of using Complementary Metal Oxide Semiconductor (CMOS) technology in imaging sensors is that the CMOS process has a relatively large inherent dark leakage current. One of the primary causes of the large dark leakage current is the reverse bias diode leakage in the photodiode. Embodiments of the invention described below with reference to FIGS. 1-8 can compensate for reverse bias diode leakage in the photodiode.

Figure 1:
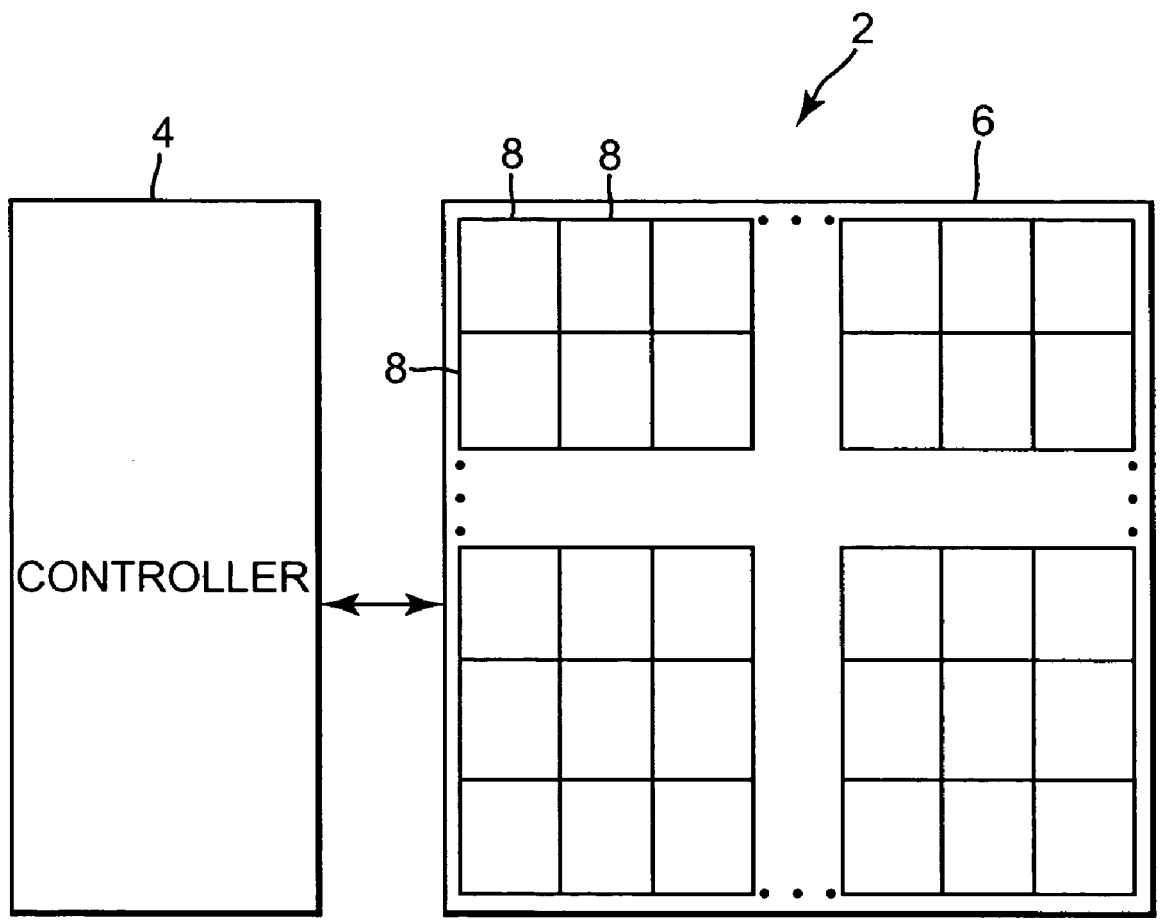
FIG. 1 is a block diagram illustrating an exemplary embodiment of an Active Pixel Sensor (APS).

FIG. 1 is a block diagram illustrating an Active Pixel Sensor (APS) 2. APS 2 includes a two-dimensional array 6 of pixels 8 aligned in rows and columns. In one embodiment, array 6 of pixels 8 is a one-dimensional array with pixels 8 aligned either in a single row or a single column. APS 2 also includes controller 4 for obtaining values indicative of the intensity of light striking each pixel 8. Controller 4 is electrically coupled to array 6.

Figure 2:
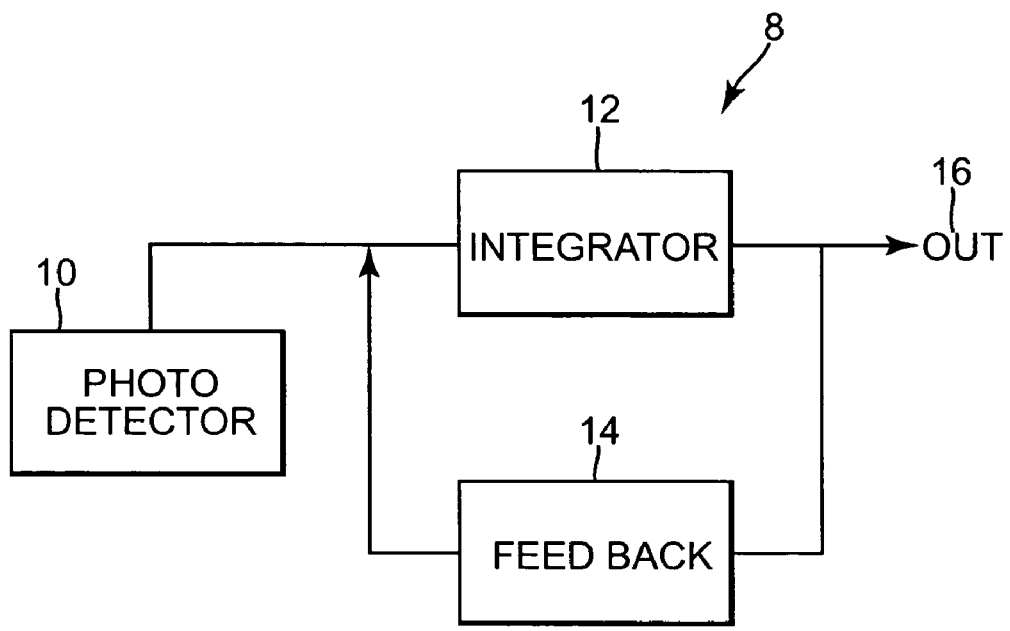
FIG. 2 is a block diagram illustrating an exemplary embodiment of one pixel of an APS with feedback loop to compensate for dark current.

FIG. 2 is a block diagram illustrating one pixel 8 of APS 2 (shown in FIG. 1). Pixel 8 includes a photodetector 10, an integrator 12, a feedback loop 14, and an output 16. Photodetector 10 is electrically coupled to integrator 12, which provides output 16. Feedback loop 14 is electrically coupled to photodetector 10 and the input and output of integrator 12.

Photodetector 10 comprises a photodiode for providing an output current indicative of an intensity of light incident the photodiode. Integrator 12 integrates the output current from photodetector 10 when photodetector 10 is exposed to light and measures the dark leakage current through photodetector 10 when photodetector 10 is not exposed to light to provide a pixel voltage. In addition, integrator 12 also sets the reverse bias voltage on photodetector 10. Feedback loop 14 receives the measurement of leakage current from integrator 12 to control integrator 12 to adjust the bias voltage across photodetector 10 to reduce the dark leakage current. In one embodiment, the dark leakage current is reduced to approximately zero or any desired level. Output 16 provides the pixel voltage indicative of the intensity of light incident on photodetector 10 when photodetector 10 is exposed to light.

Figure 3:
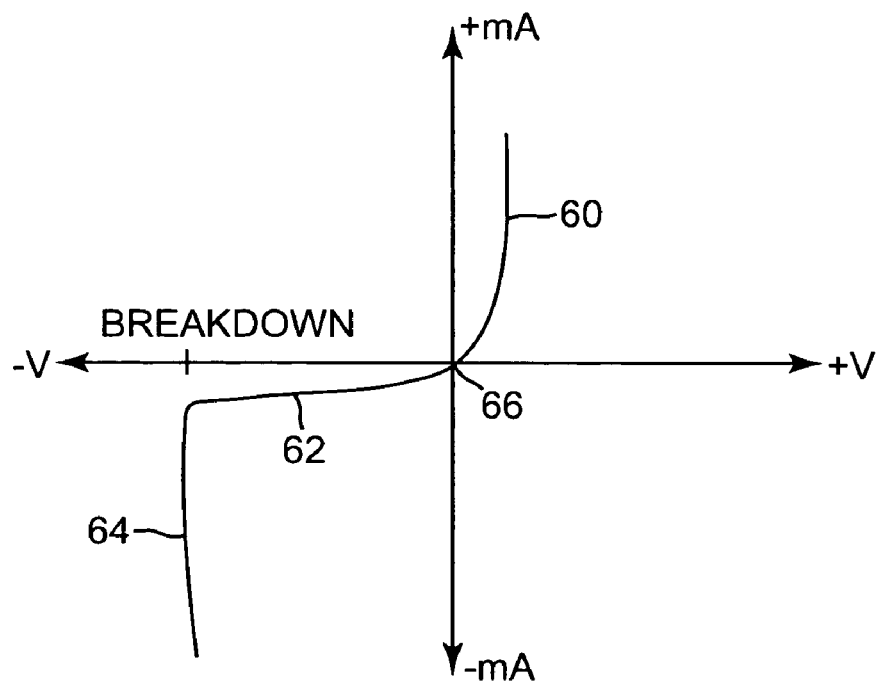
FIG. 3 is a plot of current verses voltage for a typical diode.

All diodes, including photodiodes, comprised of any type of material typically have three regions of operation, which are illustrated in FIG. 3. One region, indicated at 60, is where the diode is forward biased above some voltage resulting in a very high and exponential current. A second region, indicated at 62, is where the diode is reverse biased and there is a very low leakage current. A third region, indicated at 64, is where the diode is reverse biased below some voltage resulting in breakdown. Between forward biased region 60 and reversed biased region 62, there is a cross over point 66 where there is no current flowing through the device. This occurs at a bias of approximately zero volts, however, because of voltages induced on contacts, etc., this voltage is not exactly zero volts.

To achieve a bias voltage that will cause no leakage current or a very small insignificant leakage current in comparison to current induced by photons striking photodetector 10, APS pixel 8 attempts through feedback loop 14 to set the bias voltage on photodetector 10 at point 66 on the curve of FIG. 3. This process is used on every pixel 8 within either a one or two-dimensional sensor array.

Figure 4:
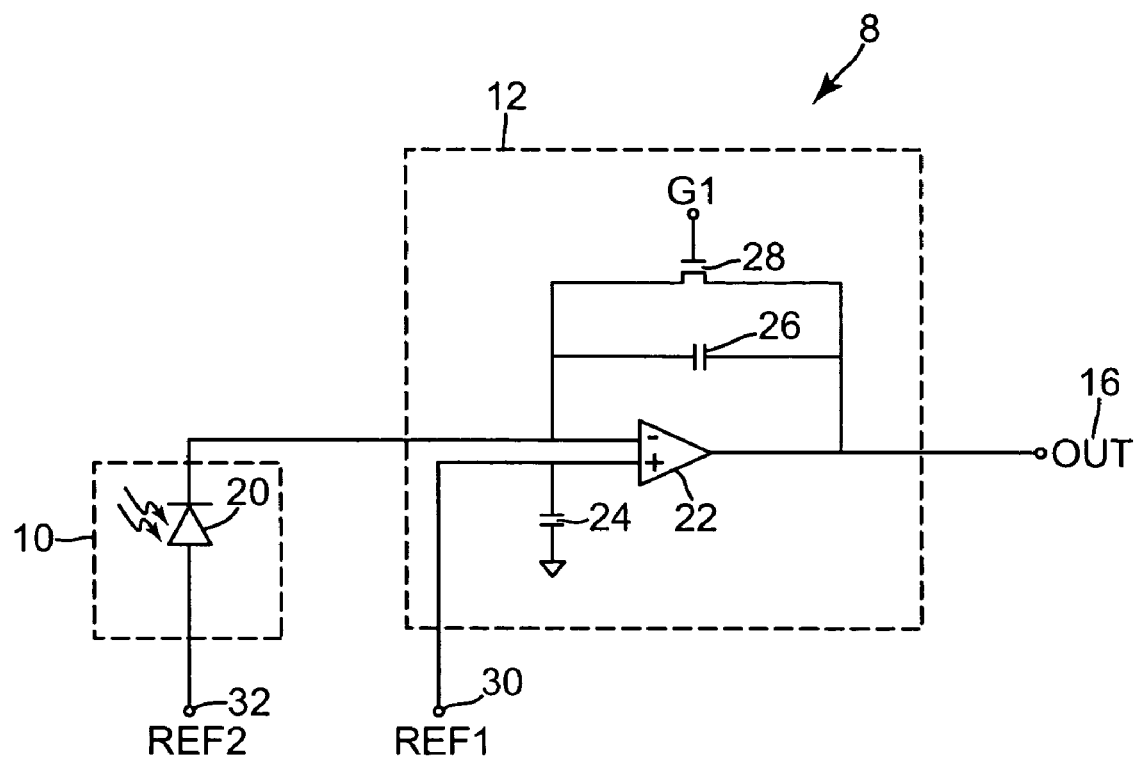
FIG. 4 is an electrical schematic diagram illustrating an exemplary embodiment of one pixel of an APS without a feedback loop.

FIG. 4 illustrates one embodiment of pixel 8 (shown in FIG. 2) of APS 2 in greater detail without feedback loop 14. In this embodiment, photodetector 10 comprises a photodiode 20. Integrator 12 comprises an operational amplifier (op amp) 22, a capacitor 24, a feedback capacitor 26 and a reset switch 28. The pixel also includes reference voltages 30 and 32 and output 16.

Integrator circuit 12 illustrated in FIG. 4 is only a representation of an integrator circuit. The actual circuit can vary without departing from the scope of this invention.

The anode of photodiode 20 is electrically coupled to reference voltage 32 and the cathode of photodiode 20 is electrically coupled to the inverting input of op amp 22. Reference voltage 30 and capacitor 24 are electrically coupled to the noninverting input of op amp 22. The output of op amp 22 provides output 16. Feedback capacitor 26 and reset switch 28 are electrically coupled between the inverting input of op amp 22 and the output of op amp 22.

Photodiode 20 is reverse biased by reference voltage 30 and reference voltage 32. The reverse bias voltage on photodiode 20 is approximately equal to reference voltage 30 minus reference voltage 32 plus any offset error in op amp 22. Photodiode 20 outputs a current signal (photocharge), which includes dark leakage current plus any current induced by photons striking photodiode 20.

Op amp 22 is a capacitive transimpedance amplifier. In one embodiment, op amp 22 is an ultra low noise precision, field effect transistor (FET) input, monolithic op amp or other suitable amplifier. Op amp 22, feedback capacitor 26, and capacitor 24 form an integrator circuit for integrating the current signal output by photodiode 20. The output of op amp 22 provides the result of the integration to output 16.

Reset switch 28 is a CMOS analog switch, or other suitable switching device. Gate G1 of reset switch 28 is electrically coupled to and controlled by controller 4 (shown in FIG. 1). Controller 4 closes switch 28 by applying a logic high level to gate G1. Closing reset switch 28 shorts the inverting input of op amp 22 to the output of op amp 22. The short resets the integration of integrator 12 causing output 16 to drop to approximately the same level as reference voltage 30. Controller 4 opens reset switch 28 by applying a logic low level to gate G1.

Figure 5:
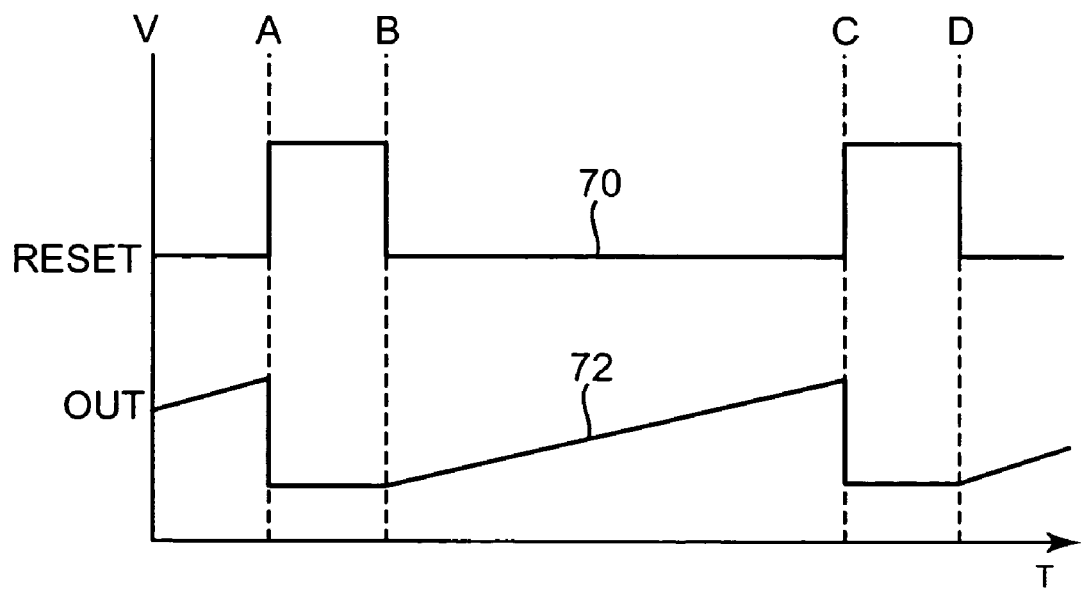
FIG. 5 is a timing diagram illustrating an exemplary embodiment of the output of the APS pixel of FIG. 3 in response to a reset signal.

FIG. 5 illustrates a timing diagram, including a reset signal, indicated by line 70, applied to gate G1 and the voltage signal on output 16, indicated by line 72, for the operation of pixel 8 shown in FIG. 4. At time A, controller 4 applies a logic high level to gate G1 of reset switch 28 causing reset switch 28 to close, which shorts the inverting input of op amp 22 to output 16. The short causes the voltage level on output 16 to drop to approximately reference voltage 30. The voltage level on output 16 remains at approximately reference voltage 30 while reset switch 28 is closed.

At time B, controller 4 applies a logic low level to gate G1 of reset switch 28 causing reset switch 28 to open. The current from photodiode 20 is integrated onto feedback capacitor 26 causing output voltage 16 to rise linearly if there is a constant current from photodiode 20.

At time C, controller 4 again applies a logic high level to gate G1 of reset switch 28 causing reset switch 28 to close until time D and the process repeats. Since pixel 8 of FIG. 4 does not include feedback loop 14, the pixel cannot compensate for dark leakage current.

Figure 6:
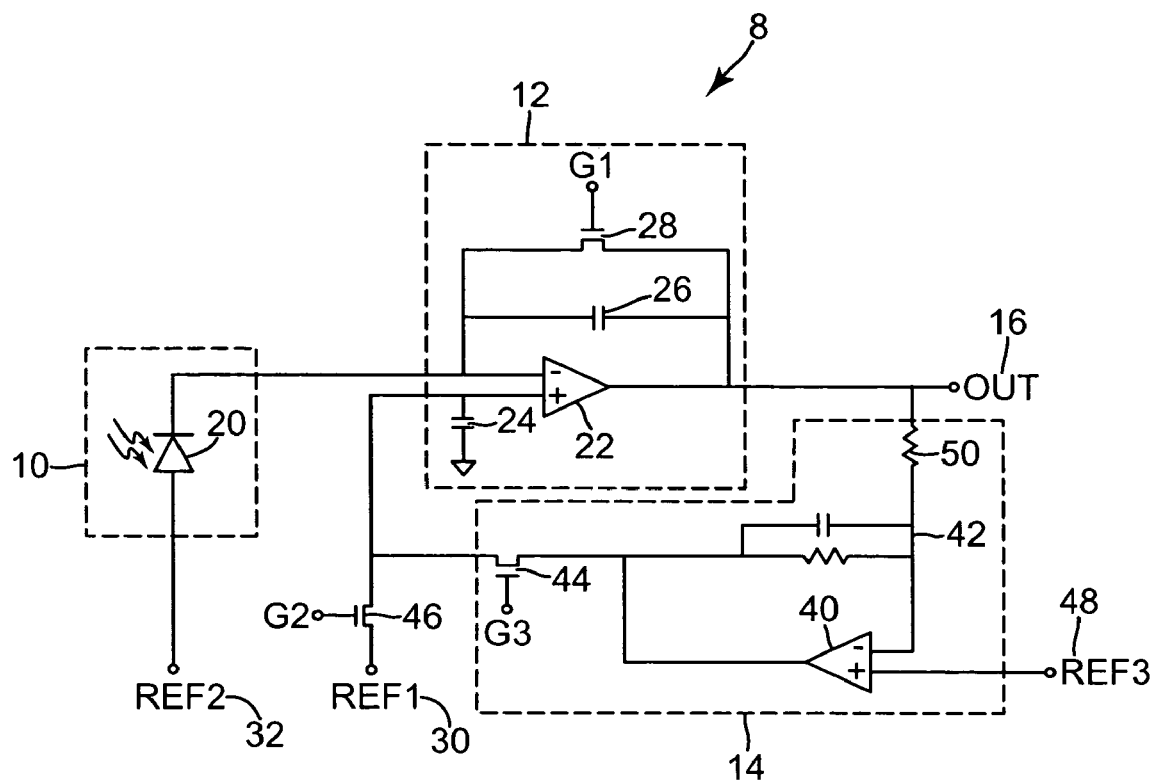
FIG. 6 is an electrical schematic diagram illustrating an exemplary embodiment of one pixel of an APS with a feedback loop.

FIG. 6 illustrates one embodiment of pixel 8 (shown in FIG. 2) of APS 2 in greater detail including feedback loop 14. This embodiment of APS pixel 8 includes all the same features of the APS pixel of FIG. 4 with the addition of feedback loop 14. Feedback loop 14 comprises op amp 40, resistor and capacitor (RC) network 42, input resistor 50, and loop enable switch 44. An additional reset switch 46 and an additional reference voltage 48 is also included.

Feedback loop 14 illustrated in FIG. 6 is only a representation of the principle of using feedback. The actual circuit can vary without departing from the scope of this invention. For example, feedback loop 14 can be designed using only CMOS op amps.

The noninverting input of op amp 40 is electrically coupled to reference voltage 48. The inverting input of op amp 40 is electrically coupled to output 16 through input resistor 50. The output of op amp 40 is electrically coupled to the noninverting input of op amp 22 and capacitor 24 through loop enable switch 44. RC network 42 is electrically coupled between the inverting input of op amp 40 and the output of op amp 40 to provide feedback for op amp 40. Reference voltage 30 is electrically coupled to the noninverting input of op amp 22 and capacitor 24 through reset switch 46.

In one embodiment, like op amp 22, op amp 40 is a capacitive transimpedance amplifier, such as an ultra low noise precision, FET input, monolithic op amp or other suitable amplifier. Op amp 40, input resistor 50, RC network 42, and reference voltage 48 form an amplifier circuit for generating a feedback signal from output 16 to supply to integrator 12. RC network 42 maintains the stability of the feedback loop for op amp 40 during operation.

In one embodiment, like reset switch 28, loop enable switch 44 and reset switch 46 are analog CMOS switches or other suitable switching devices. Gate G2 of reset switch 46 and gate G3 of loop enable switch 44 are electrically coupled to and controlled by controller 4 (shown in FIG. 1). Controller 4 applies a logic high level to gate G2 of reset switch 46 to close reset switch 46, which shorts reference voltage 30 to integrator 12. Controller 4 applies a logic low level to gate G2 of reset switch 46 to open reset switch 46, which isolates reference voltage 30 from integrator 12. Controller 4 applies a logic high level to gate G3 of loop enable switch 44 to close loop enable switch 44, which shorts feedback loop 14 to integrator 12. Controller 4 applies a logic low level to gate G3 of loop enable switch 44 to open loop enable switch 44, which isolates feedback loop 14 from integrator 12.

Figure 7:
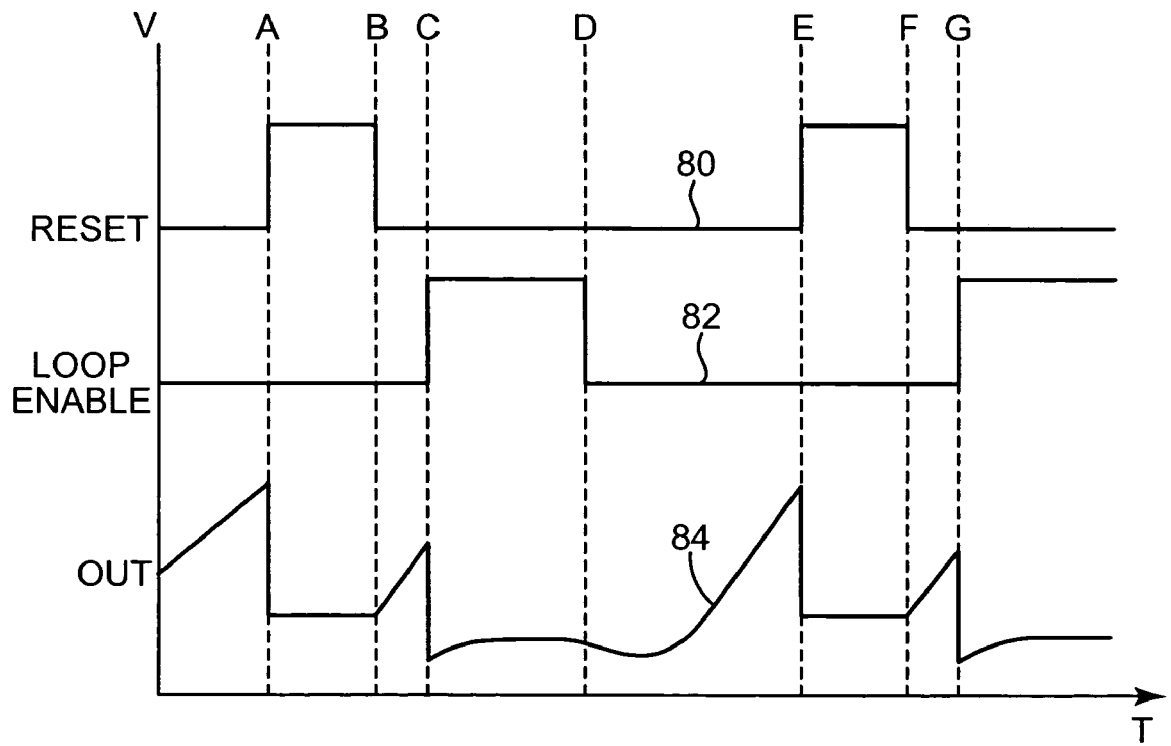
FIG. 7 is a timing diagram illustrating an exemplary embodiment of the output of the APS pixel of FIG. 5 in response to reset and loop enable signals.

FIG. 7 illustrates a timing diagram for pixel 8 shown in FIG. 6 including a reset logic signal, indicated by line 80, a loop enable signal, indicated by line 82, and the voltage signal on output 16, indicated by line 84. At time A, photodiode 20 is cut off from light. Controller 4 applies a logic high level to gate G1 of reset switch 28 and gate G2 of reset switch 46 causing reset switches 28 and 46 to close. Closing reset switch 28 shorts the inverting input of op amp 22 to output 16 and closing reset switch 46 shorts reference voltage 30 to the noninverting input of op amp 22 and capacitor 24. Closing reset switches 28 and 46 causes the voltage level on output 16 to drop to approximately reference voltage 30. The voltage level on output 16 remains at approximately reference voltage 30 while reset switches 28 and 46 are closed. Capacitor 24 is charged to approximately reference voltage 30.

At time B, controller 4 applies a logic low level to gate G1 of reset switch 28 and gate G3 of reset switch 46 causing reset switches 28 and 46 to open. Opening reset switch 28 starts the integration of integrator 12. Opening reset switch 46 isolates integrator 12 from reference voltage 30 leaving a charge of approximately reference voltage 30 on capacitor 24. The dark leakage current from photodiode 20 is integrated onto feedback capacitor 26 causing the output voltage 16 to rise linearly if there is a constant current from photodiode 20.

At time C, controller 4 applies a logic high level to gate G3 of loop enable switch 44 causing loop enable switch 44 to close, which shorts feedback loop 14 to integrator 12. This activates feedback loop 14, which amplifies output 16 and generates a feedback signal to integrator 12. The feedback signal adjusts the charge on capacitor 24, which adjusts the bias on photodiode 20. The bias is adjusted to reduce the dark leakage current from photodiode 20. As the dark leakage current from photodiode 20 is reduced, the voltage on output 16 drops. The dark leakage current from photodiode 20 is reduced to approximately zero or any suitable desired level where the effect of the dark leakage current is substantially eliminated. The dark leakage current remains substantially constant while loop enable switch 44 is closed.

At time D, controller 4 applies a logic low level to gate G3 of loop enable switch 44, which opens loop enable switch 44. Feedback loop 14 is isolated from integrator 12 leaving the bias on photodiode 20 at the level the bias was set at by feedback loop 14. At D, photodiode 20 is also exposed to light. The current output by photodiode 20 is integrated on feedback capacitor 26, which causes output 16 to rise linearly. Output 16 provides a value indicative of the intensity of light incident on photodiode 20. The process is then repeated starting at E and continuing to F and G.

Figure 8:
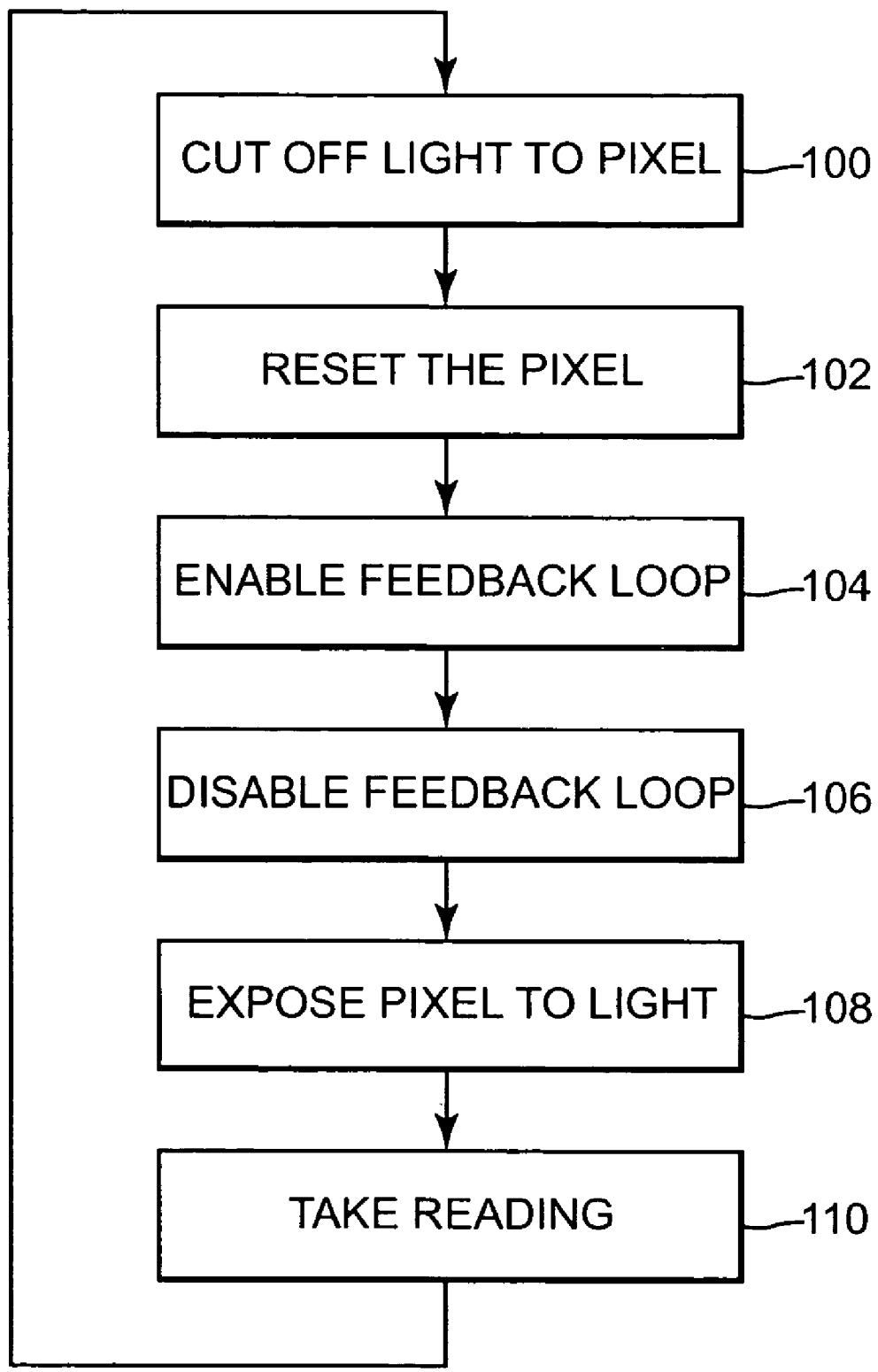
FIG. 8 is a flow diagram illustrating an exemplary embodiment of a method of using an APS pixel with feedback loop.

FIG. 8 is a flow diagram illustrating how APS pixel 8 of FIG. 6 is used to sense light. At 100, pixel 8 is cut off from light so that the only current present is dark leakage current. Pixel 8 can be cut off from light by closing a mechanical shutter or by any other suitable means. At 102, pixel 8 is reset, which causes output 16 from pixel 8 to drop. At 104, feedback loop 14 is enabled to compensate for the dark leakage current by adjusting the bias on photodiode 20 to force output 16 to approximately zero or another suitable level. With the bias voltage set on photodiode 20 to eliminate or at least substantially reduce the dark leakage current from photodiode 20, feedback loop 14 is disabled at 106. At 108, pixel 8 is exposed to light. Pixel 8 can be exposed to light by opening a mechanical shutter or by any other suitable means. At 110, a value indicative of the intensity of light can be obtained on output 16 without substantial interference from dark leakage current. The process is then repeated. The process can be applied to every pixel in a sensor array and repeated for every pixel in the sensor array at any frequency between approximately 1 Hz and 100 kHz.

Therefore, by controlling the bias on a photodiode using a feedback loop to compensate for dark leakage current, germanium and other suitable low cost semiconductors can be utilized in the manufacture of image sensing arrays, such as infrared light or visible light image sensing arrays. The effect of dark leakage current on the output of the sensor can be reduced by at least one order of magnitude. Image sensing arrays, including both one or two dimensional arrays of pixels and all the necessary circuitry required for each pixel, can be integrated into a single semiconductor chip. The substrate for the semiconductor chip can be made from germanium, silicon, indium gallium arsenide, indium phosphide, mercury cadmium telluride, or any other suitable semiconductor.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An active pixel sensor comprising:
   a photodiode providing a photodiode output current indicative of an intensity of light incident the photodiode;
   an integrator circuit electrically coupled to the photodiode and configured to provide a pixel voltage representing an integration of the photodiode output current when the photodiode is exposed to light and dark leakage current through the photodiode when the photodiode is not exposed to light and configured to set a reverse bias voltage on the photodiode and respond to at least one control input to set the reverse bias voltage to a first level; and
   a feedback loop configured to receive the pixel voltage and control the integrator circuit to adjust the reverse bias voltage to substantially reduce the dark leakage current through the photodiode to a desired level, wherein the feedback loop is configured to control the integrator circuit to adjust the reverse bias on the photodiode to maintain a substantially stable pixel voltage when the photodiode is not exposed to light.

2. The active pixel sensor of claim 1, wherein the light is one of infrared light and visible light.

3. The active pixel sensor of claim 1, wherein the substantially stable pixel voltage is approximately zero volts.

4. The active pixel sensor of claim 1, wherein the integrator circuit and feedback loop are configured to reduce by at least one order of magnitude an effect of the dark leakage current through the photodiode on the photodiode output current.

5. The active pixel sensor of claim 1, wherein the photodiode comprises germanium.

6. The active pixel sensor of claim 1, wherein the integrator circuit comprises:
 an op amp having:
  a signal input electrically coupled to the photodiode;
  a reference input electrically coupled to a reference voltage; and
  an op amp output that provides the pixel voltage.

7. The active pixel sensor of claim 6, wherein the integrator circuit comprises a reset switch for shorting the signal input to the op amp output.

8. The active pixel sensor of claim 6, wherein the integrator circuit comprises a capacitor electrically coupled between the signal input and the op amp output.

9. The active pixel sensor of claim 6, wherein the integrator circuit comprises a capacitor electrically coupled between the reference input and ground.

10. The active pixel sensor of claim 1, wherein the feedback loop comprises:
 an op amp having:
  a signal input electrically coupled to the integrator circuit;
  a reference input electrically coupled to a reference voltage; and
  an op amp output electrically coupled to the integrator circuit.

11. The active pixel sensor of claim 10, wherein the feedback loop comprises a loop enable switch electrically coupled between the op amp output and the integrator circuit.

12. An active pixel sensor comprising:
 a first pixel; a second pixel proximate the first pixel; a third pixel proximate the second pixel; and a fourth pixel proximate the third pixel, wherein the first pixel, the second pixel, the third pixel, and the fourth pixel each comprise:
 a photodiode providing a photodiode output current indicative of an intensity of light incident the photodiode;
 an integrator circuit electrically coupled to the photodiode and configured to provide a pixel voltage representing an integration of the photodiode output current when the photodiode is exposed to light and dark leakage current through the photodiode when the photodiode is not exposed to light and configured to set a reverse bias voltage on the photodiode and respond to at least one control input to set the reverse bias voltage to a first level; and
 a feedback loop configured to receive the pixel voltage and control the integrator circuit to adjust the reverse bias voltage to substantially reduce the dark leakage current through the photodiode to a desired level, wherein the feedback loop is configured to control the integrator circuit to adjust the reverse bias on the photodiode to maintain a substantially stable pixel voltage when the photodiode is not exposed to light.

13. The active pixel sensor of claim 12, wherein the first pixel, second pixel, third pixel, and fourth pixel are arranged in one of a one dimensional array and a two dimensional array.

14. The active pixel sensor of claim 12, wherein the first pixel, second pixel, third pixel, and fourth pixel are all on a single semiconductor substrate.

15. The active pixel sensor of claim 14, wherein the semiconductor substrate comprises germanium.

16. The active pixel sensor of claim 14, wherein the semiconductor substrate comprises at least one of silicon, indium gallium arsenide, indium phosphide, and mercury cadmium telluride.

17. A method for compensating for dark leakage current in a pixel of an active pixel sensor comprising:
 setting a reverse bias voltage on a photodiode with an integrator circuit electrically coupled to the photodiode;
 cutting off light to the photodiode;
 controlling the integrator circuit to set the reverse bias voltage on the photodiode to a first level; and
 controlling the integrator circuit with a feedback loop to adjust the reverse bias voltage to substantially reduce a dark leakage current to a desired level, wherein the feedback loop is configured to control the integrator circuit to adjust the reverse bias on the photodiode to maintain a substantially stable pixel voltage when the photodiode is not exposed to light.

18. The method of claim 17, wherein the desired level is approximately zero.

19. The method of claim 17, wherein the desired level is a level that substantially eliminates the dark leakage current.

20. The method of claim 17, further comprising:
 disabling the feedback loop after the dark leakage current has been reduced to the desired level;
 exposing the photodiode to light to provide a photodiode output current indicative of an intensity of the light; and
 integrating the photodiode output current with the integrator circuit to obtain a pixel voltage.

21. The method of claim 17, wherein cutting off light to the photodiode comprises closing a shutter and wherein exposing the photodiode to light comprises opening a shutter.

22. The method of claim 21, further comprising:
 repeating the steps of:
  cutting off light to the photodiode;
  controlling the integrator circuit to set the reverse bias voltage on the photodiode to the first level;
  controlling the integrator circuit with a feedback loop to adjust the reverse bias voltage to substantially reduce the dark current to the desired level;
  disabling the feedback loop after the dark leakage current has been reduced to the desired level;
  exposing the photodiode to light to provide the photodiode output current indicative at the intensity of the light; and
  integrating the photodiode output current with the integrator circuit to obtain a pixel voltage.

23. The method of claim 22, wherein the steps are repeated at a frequency between approximately 1 Hz and 100 kHz.

* * * * *